(12) United States Patent
Kenjalkar et al.

(10) Patent No.: US 9,924,026 B2
(45) Date of Patent: Mar. 20, 2018

(54) MANAGING CLASSROOM ATTENDANCE AND STUDENT DEVICE USAGE

(71) Applicant: AIRWATCH LLC, Atlanta, GA (US)

(72) Inventors: Avanti Kenjalkar, Atlanta, GA (US); Nithin Bhaktha, Bangalore (IN); Sravan Reddy Rekula, Sunnyvale, CA (US); Pranay Swar, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 42 days.

(21) Appl. No.: 14/884,791

(22) Filed: Oct. 16, 2015

(65) Prior Publication Data

US 2016/0381210 A1 Dec. 29, 2016

(30) Foreign Application Priority Data

Jun. 24, 2015 (IN) .......................... 3186/CHE/2015

(51) Int. Cl.
*H04M 1/725* (2006.01)
*H04L 29/08* (2006.01)
*H04W 4/02* (2009.01)
*H04L 12/24* (2006.01)
*H04W 4/06* (2009.01)
*H04W 76/06* (2009.01)

(52) U.S. Cl.
CPC ........ *H04M 1/72577* (2013.01); *H04L 41/22* (2013.01); *H04L 67/02* (2013.01); *H04W 4/021* (2013.01); *H04W 4/06* (2013.01); *H04W 76/068* (2013.01)

(58) Field of Classification Search
CPC ......... H04W 4/021; H04W 4/00; H04W 4/06; H04W 76/068; H04M 1/72577; H04M 1/72572; H04M 1/725; H04M 1/72569; H04L 63/102; H04L 67/02; H04L 63/10; H04L 41/22; G07C 9/00111
See application file for complete search history.

(56) References Cited

U.S. PATENT DOCUMENTS

| | | | |
|---|---|---|---|
| 8,353,705 B2 * | 1/2013 | Dobson ............... | G07C 9/00111 340/10.1 |
| 2002/0085029 A1 * | 7/2002 | Ghani .................... | G06Q 10/10 715/751 |
| 2012/0202185 A1 * | 8/2012 | Jabara ..................... | G09B 5/00 434/350 |
| 2015/0304484 A1 * | 10/2015 | Halmstad .......... | H04M 1/72577 455/419 |

* cited by examiner

Primary Examiner — Charles Appiah
Assistant Examiner — Margaret G Mastrodonato
(74) Attorney, Agent, or Firm — Clayton, McKay & Bailey, PC

(57) ABSTRACT

Systems and methods presented herein can allow a teacher to manage student devices in a classroom setting to increase learning efficiency. The teacher device can receive peer-to-peer broadcasts from the student devices and track class attendance based on the broadcasts. The teacher device can also apply locks and lock profiles to the functionality of the student devices, such as restricting websites and document access, without impacting the functionality of the student device outside of the classroom and/or school setting. The locks on the student devices can be automatically unlocked at the end of a class or school day.

20 Claims, 13 Drawing Sheets

MANAGING CLASSROOM ATTENDANCE AND STUDENT DEVICE USAGE

CROSS-REFERENCE TO RELATED APPLICATIONS

Benefit is claimed under 35 U.S.C. 119(a)-(d) to Foreign application Serial No. 3186/CHE/2015 filed in India entitled "MANAGING CLASSROOM ATTENDANCE AND STUDENT DEVICE USAGE" on Jun. 24, 2015, by AIRWATCH LLC, which is herein incorporated in its entirety by reference for all purposes

BACKGROUND

Educational institutions, such as schools and universities, constantly seek ways to leverage technology to effectively educate their students. Some schools have attempted to utilize student devices (such as cell phones, tablets, and laptops) for portions of the learning experience due to the widespread proliferation of these devices. But mobile devices have also proven to be a distraction in the classroom environment, and in some cases, can be used as a tool for cheating.

Attempts to leverage technology to add efficiencies to classroom processes such as roll call have been only moderately successful. For example, a teacher can be able to use an electronic spreadsheet to track student attendance, but this still requires going line by line to determine attendance. As a result, the process by which teachers perform roll call carries most of the same historical inefficiencies. Every minute devoted to such activities is a minute diverted away from teaching. In an environment where students often attend multiple classes with different teachers within the span of a day, these inefficiencies can become significant. If a class is only an hour long (or less), devoting even one minute to roll call has a cumulative impact on the amount of teaching and learning that can take place over the course of a semester or a year.

Meanwhile, management of mobile devices in a classroom setting is a serious issue. In some cases, teachers ban mobile devices despite potential efficiency benefits over pen and paper, simply because the potential for distractions and cheating is too high. Oftentimes, an instructor must pause from teaching to request that a student turn off a ringing phone, interrupting the flow of teaching and learning.

Current technological solutions for limiting use of mobile devices in the classroom are largely limited to device-specific restrictions imposed by parents on their children's devices, such as cell phones. Mobile devices can be manually and individually set to lock functionality based on geofencing an entire school area, for example, so that the student can not use the cell phone at school. This can pose problems when a student is no longer in class but still onsite, and does not address the problem of managing the mobile devices on a classroom-by-classroom basis. Centralized solutions have been largely non-existent, in part because of the many different types of mobile devices available, with disparate operating systems and applications. Additionally, school systems cannot afford to purchase and maintain specialized mobile devices for all of their students, and even if they could, it would not solve the issue of students' personal mobile devices becoming a distraction in class.

Based on at least these problems, a need exists for systems that better manage mobile devices to increase the efficiency of teaching in a classroom environment.

SUMMARY

Examples described herein include systems that manage mobile devices to determine classroom attendance and control device functionality.

In one example, a system allows a teacher (e.g., instructor, professor, or managing user) to manage student devices in a classroom environment. The system can include a non-transitory, computer-readable medium containing instructions, an interface for sending and receiving wireless transmissions, a screen for displaying a user interface, and a processor that executes the instructions to perform stages.

In one system, a teacher device having a processor executes stages that can include receiving, over a peer-to-peer network, a first transmission from a plurality of student devices, including a first student device. The processor can then determine that the first student device is associated with the first class, and count the first student device as present in the class. To indicate the first student device is present, the processor can cause the display of the teacher device to visually indicate that the first student device is present in the class, such as by highlighting an icon representative of the first student device amongst a set of icons representative of student devices associated with the class.

The processor can further send a first message to apply a first lock to the first student device. In one example, this can include sending the first message to a management server. The processor can further send a second message to remove the first lock from the first student device. In one example, this can include sending the second message to the management server.

In another example, a system for managing student devices can include a management server that includes a database. The database can store a plurality of student device identifiers, teacher device identifiers, and classroom identifiers. The database can associate the first student device with a first student device identifier. The database can also associate the first student device identifier to with a first classroom identifier. A first teacher device corresponding to a first teacher identifier can also be associated with the first classroom identifier.

The management server can also include at least one processor that performs stages including receiving a lock request from the first teacher device. The lock request can pertain to at least the first student device. In response to the lock request, the processor can cause a lock to be applied to the first student device, such as an application lock, file access lock, or web access lock. The management server can also receive an unlock request from the first teacher device, and in response to the unlock request, cause the lock to be deactivated on the first student device. The management server can also, in an example, determine that a class should be dismissed based on a time threshold, and remove locks applied to the student devices as part of that class.

In another example, the first student device can include a non-transitory computer-readable medium containing instructions, an interface for sending and receiving wireless transmissions, a screen for displaying a graphical user interface, and a processor that executes the instructions to perform stages.

The stages performed by the student device can include broadcasting a signal over a peer-to-peer network that indicates the student device is present. The broadcast signal can include a class identifier associated with the class. Further, the processor can execute an application that receives a message to initiate a lock via an application programming interface. Later, the student device can receive a second message to remove the lock.

It is to be understood that both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this disclosure, illustrate various examples and together with the description, serve to explain the principles of the disclosure. In the drawings.

DESCRIPTION OF THE EXAMPLES

Figure 1:
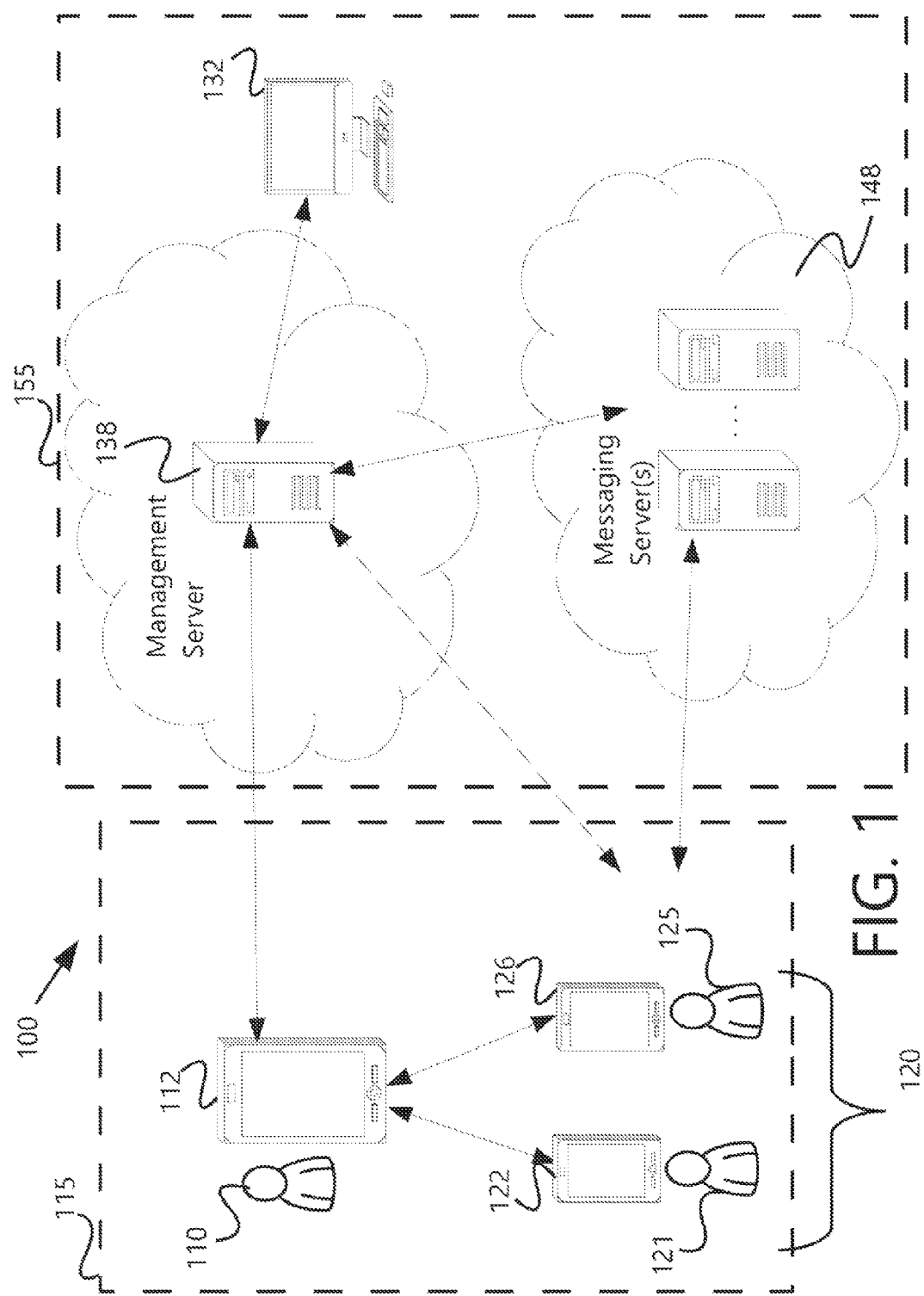
FIG. 1 is an exemplary illustration of a system for managing student devices in a classroom environment.

Reference will now be made in detail to the present examples, including examples illustrated in the accompanying drawings. Wherever possible, the same reference numbers will be used throughout the drawings to refer to the same or like parts.

Examples herein allow a teacher to manage student devices in a classroom to create classroom efficiencies and limit abuses and distractions. In particular, the system can track which students and/or student devices are present in the classroom based on peer-to-peer communications, and can apply locks and otherwise manage usage of the student devices through use of a server-based network.

A "student device" is an example of a user device. The user device can be any mobile computing device, such as a cell phone, laptop, or tablet. The "teacher device" is an example of a master device. The master device can be any computing device, including mobile computing devices and stationary workstations. The classroom is an example of an environment in which the system can operate. A class is one type of session for which the system can monitor attendance and apply locks to user devices.

A teacher can initiate class by entering a classroom with a teacher device, such as a cell phone or tablet. The teacher device can then receive peer-to-peer transmissions, such as Bluetooth communications, from student devices that indicate the student device is present in the class. The student device can broadcast (e.g., transmit) a peer-to-peer session including a session identifier (e.g., a class identifier) that the teacher device recognizes as associated with the class.

The teacher device can also correlate transmitted device identifiers to students in the class, causing the teacher device to indicate which students are present on a graphical user interface. The teacher device can continue to monitor which student devices are present and update the graphical user interface accordingly, as described herein.

Using the same graphical user interface, the teacher can apply locks to the student devices, which can restrict which resources the student device can access. The locks can include file locks (e.g., white-listing files, black-listing files, or otherwise restricting which files can be accessed), application locks (e.g., white-listing applications, black-listing applications, or otherwise restricting which applications or application functionality can be accessed), and web locks (e.g., white-listing web applications or websites, black-listing web applications or websites, or otherwise restricting web applications or the accessibility of one or more websites). In one example, the locks can be defined and applied via a separate server-based network. This can include locking the student device into a learning application, and then locking and unlocking resources (e.g., assets) accessible within that learning application. Example resources can include files and/or websites that are accessible from within the learning application or other locked application. While a device is locked, certain functionality can be disabled. For example, touch input, audio playback, voice call usage, navigation abilities (e.g., to other applications, files, or websites), and other features can be restricted.

The teacher can dismiss class by selecting a class dismiss option within the interface of the teacher device in one example. Upon doing so, the server-based network can remove one or more of the locks from the student devices. Class can be dismissed automatically in one example, such as when a time threshold for a class has been exceeded or the teacher initiates a different class.

FIG. 1 shows an exemplary illustration of a simplified system 100 for managing student devices 122 and 126 in a classroom environment. In this example, a teacher 110 having a teacher device 112 can manage a plurality of student devices 122 and 126 used by students 121 and 125 in the teacher's class. Although only two students 121 and 125 are pictured, the class can include a plurality of students 120, each having one or more student devices.

The teacher device 112 can include a computer-readable medium containing instructions that are executed by a processor in the teacher device 112, causing the teacher device 112 to carry out stages necessary to communicate with student devices 122 and 126 and management server 138. Likewise, a student 121 can use a student device 122 that includes a processor that executes instructions to carry out additional stages necessary to communicate with the teacher device 112, the management server 138, and/or messaging server 148.

The teacher device 112 and student devices 122 or 126 can be considered computing devices for the purposes of this disclosure. Each computing device can be any processor- or controller-based device for displaying, storing, receiving, and transmitting information. For example, each computing device can be a cell phone, smart phone, tablet, laptop, personal computer, or television. Other examples of computing devices include any portable or non-portable, processor- or controller-based device. Additional example computing devices 112 are discussed below, and any device capable of transmitting, receiving, storing, or displaying the content discussed herein is contemplated. The teacher device 112 can be a stationary computer in an example, such as a workstation in a classroom, or a mobile personal device in another example.

In the example of FIG. 1, the teacher 110 can use his or her computing device 112 to track student attendance and manage student device 122 functionality. The attendance tracking can be performed based on peer-to-peer communications, which are indicated in portion 115 of the system 100. Management services can be accomplished in conjunction with the attendance tracking, but can further utilize a server-based network as illustrated in section 155 of system 100.

The teacher device 112 and student devices 122 and 126 can communicate and perform some stages via peer-to-peer communications 115. These peer-to-peer communications 115 can rely on one or more wireless transmission protocols such as Bluetooth, local WIFI connectivity, or other peer-to-peer communication protocols in an example. The peer-to-peer transmissions can occur directly between devices without the need for a server to manage attendance-related communications or information transfer in one example.

The system can additionally implement a server-based network 155 for management services. The server-based network 155 can include management server 138, an administrative console 132, and can include a messaging server 148. The management server 138 can be responsible for storing which student devices 122 and 126 correspond to which students 120. The management server 138 can also store which students 120 correspond to which classes, and which teachers 110 and teacher devices 112 correspond to which classes. These relationships can be stored in a database that is part of or accessed by the management server 138. The management server 138 can also be responsible for coordinating and storing locks for files, applications, and web access, and facilitating the locking of particular student devices 122 and 126.

Student devices 122 and 126 can be personal devices that include personal applications and data. But through use of procedure calls to one or more application programming interfaces, the management server 138 can lock the student device 122 into particular applications, files, and websites as part of a class. This can be accomplished through interactions with the operating system of the student device 122 and/or a specific application executing on the student device 122.

As part of the locking operation and as more fully described below, the teacher device 112 can initiate a lock or remove a lock by contacting the management server 138 over a network, such as the Internet. The management server 138 can be in communication with student devices 122 and 126 and/or messaging server 148 over the Internet or other network(s). Upon receiving a lock request (e.g., instruction) from the teacher device 112, the management server 138 can utilize an application program interface (API) 535 or 545 to send one or more messages to the student device 122. The management server 138 can transmit commands to a messaging server 148 as part of that process.

Different operating systems can have different procedures to leverage for locking various resources. Based on the operating system of the student device 122, the management server 138 can determine a messaging server to contact. For example, if the first student device 122 is running a first operating system, the management server 138 can contact a messaging server 148 that is configured for communications with the first operating system of the first student device 122. The management server 138 can likewise determine that the second student device 126 utilizes a second operating system and, as a result, contact a cloud messaging server 148 that can interact with the second operating system. The cloud messaging server 148 can contact the second student device 126, causing the second student device 126 to fetch a lock instruction from the management server 138.

As a further example, a teacher 110 can initiate a lock on a first student device 122 by selecting an icon associated with a student on a graphical user interface displayed on the teacher device 112. (For the purposes of this disclosure, selecting the student is understood to select the student's mobile device.) Additional icons can also represent a group of students for selection. After selecting the first student device 122 or a group of students, the teacher 110 can select a type of lock to apply, including an application lock, file lock, and/or web lock. The teacher device 112 can then be presented with various assets (e.g., resources) to which the lock type can apply. After selecting which resources should be locked, the teacher can also select timing information for the lock. The lock command can also be sent to devices automatically upon detecting the device presence, without requiring selection by the teacher.

When the selections are complete, the teacher device 112 can send a lock request to the management server 138 to apply the specified lock on the selected student device 122. The lock request can occur as a series of messages in one example. For each student device 122 and 126, the management server 138 can query a database to determine the operating system (OS) for that student device 122 or 126. Then, the management server 138 can instruct the applicable messaging server 148 (if applicable) to contact the student device 122 or 126, which can cause the student device 122 or 126 to check with the management server 138 to receive a lock instruction. After the student device 122 or 126 contacts the management server 138, the management server 138 can send lock instructions the student device 122 or 126.

Management server 138 and messaging server 148 can each include one or more servers. For example, messaging server 148 can include a plurality of servers owned by third parties located at different locations, each of which are responsible for sending messages to student devices 122 and 126 that can be running different operating systems with which different messaging servers 148 can communicate. In one example, the management server 138 and messaging server 148 are part of the same server. In another example, system 100 can use its own messaging server 148, alone or in combination with messaging servers for a particular operating system.

An administrative console 132 can allow an administrator user to create default locks that can be selectable with the teacher device 112 in one example. For example, the administrator user can create a lock profile that is relevant for a math class, where only a select few websites will be accessible and only a particular calculator application will be useable. The lock profile can contain a series of lock types. In one example, a lock profile can be updated to new configurations based on upcoming lesson plans. The teacher 110 can select the lock profile on the teacher device 112 and cause the series of pre-configured locks to be applied to one or more student devices 122 and 126.

The administrator can further specify resources to send to the student devices 122 and 126. In this way, students in a particular class can receive relevant documents prior to class that are used for learning during class. Thus, the teacher can lock the student devices 122 and 126 into those documents.

The computing devices (e.g., teacher device 112 and student devices 122 and 126) can each still utilize software locally on the respective device to execute the attendance functionality and the lock functionality. The software can include a set of instructions stored remotely on a computer-readable medium, such as at management server 138. Each user can access the instructions, such as over the Internet, downloading them to the respective computing device for local execution. Execution of these instructions by a student device 122 and 126 and/or teacher device 112 can allow the respective computing device to coordinate with each other, as well as management server 138 and/or messaging server 148, in an example.

Figure 2:
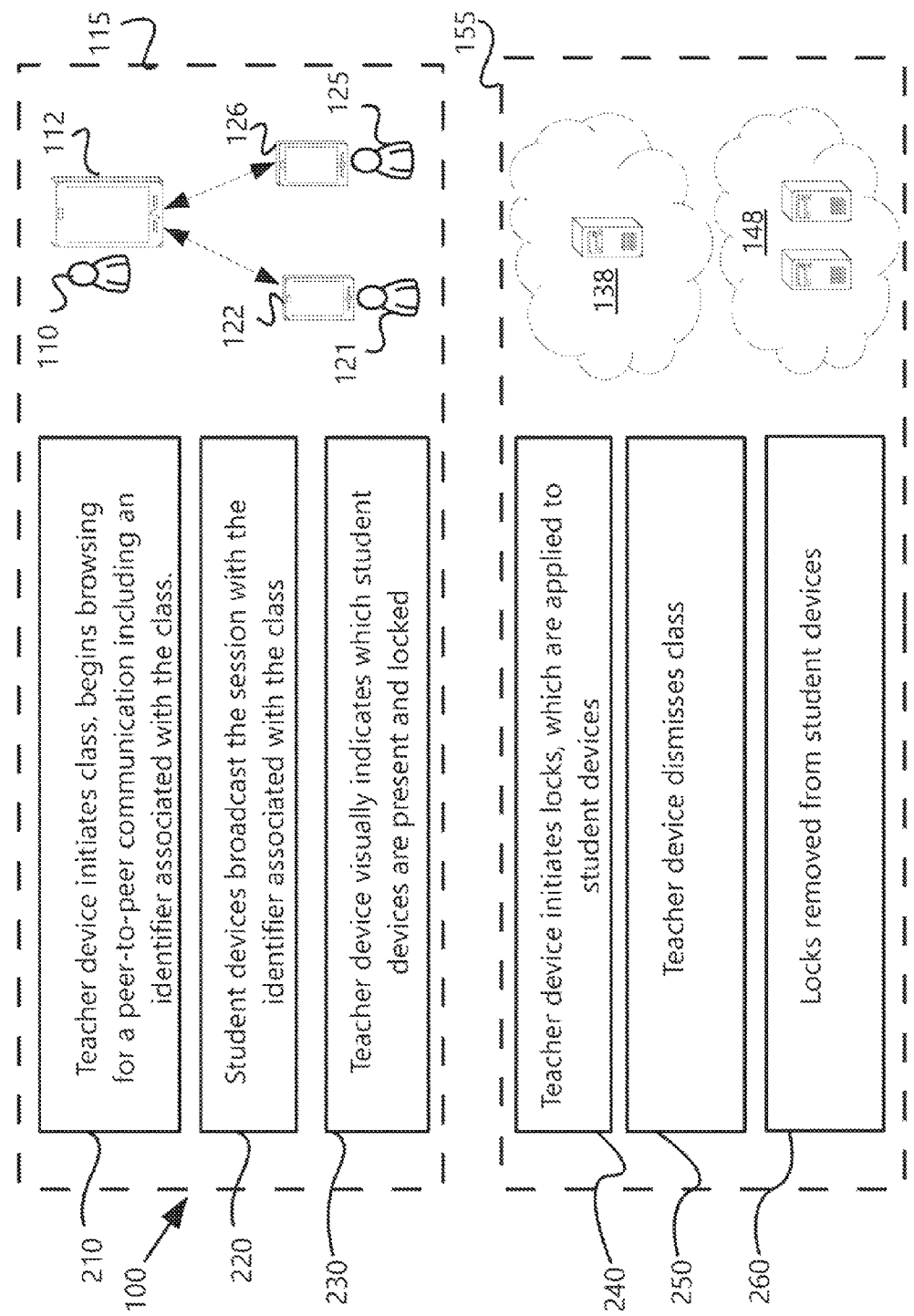
FIG. 2 is an exemplary illustration of a system for managing student devices in a classroom environment.

Turning to FIG. 2, an exemplary overview of interactions between components of the system 100 is presented. Exemplary stages are presented for both the peer-to-peer communications 115 and the server-based communications 155 portions of the system 100.

As illustrated in this example, at stage 210 the teacher device initiates class. In one example, the teacher 110 manually initiates the class by selecting a class and/or touching a button presented on a graphical user interface of the teacher device 112.

In another example, the class initiation process can be performed automatically by the teacher device 112. This can occur, for example, when the teacher device 112 detects that it is within a predefined time window (e.g., a range with a start date and time and an end date and time associated with the class). In addition or in the alternative, the teacher device 112 can initiate class when it detects that it is within a geographic boundary of the classroom. The teacher device can make this detection by comparing GPS coordinates to a pre-determined geo-fencing boundary for the classroom in one example. The geo-fencing boundary and pre-determined time frame can be downloaded from the management server 138 and stored locally on the teacher device 112 in one example. In another example, each classroom can contain a beacon device that locally broadcasts a signal (e.g., transmission) that can be recognized by the teacher device 112. Upon recognizing the signal, the teacher device can initiate class.

In one example, the teacher device 112 initiates class by browsing for peer-to-peer broadcasts of sessions (e.g., service types) that contain an identifier that the teacher device 112 associates with the class. In one example, the identifier is a class identifier, such as a code that is specific to the class. In another example, the identifier is a user device identifier that the teacher device 112 associates with the class. In still another example, the identifier includes both the class identifier and the device identifier.

The associations of user device identifiers to classes to which the teacher device 112 is assigned can be pre-downloaded by the teacher device 112, in one example. The teacher device 112 can contact management server 138 before classes begin each day, and download the relevant relationship information, which can be stored at server 138. Server 138 can store user device identifiers (e.g., student device identifiers), master device identifiers (e.g., teacher device identifiers), session identifiers (e.g., classroom identifiers), and the relationships between them in a database.

At stage 220, student devices 122 and 126 can begin broadcasting sessions containing the identifier associated with the class. For example, a multipeer object can fetch class metadata and instantiate a service type that includes the class identifier. For example, a service type include a string format in an example that includes "cl-[class identifier]". The multipeer manager object can also hold a reference to the device identifier (unique to the teacher device 112) and a session identifier. The session identifier can become active once the student device 122 and teacher device 112 connect with one another over the multipeer protocol, and can void when the connection is inactive or suspended.

A student can manually trigger the broadcast in one example by using a graphical user interface on the student device 122 to select the class from a plurality of classes.

To begin broadcasting, in one example the student device 122 must first authenticate that a first student is present. This can help prevent students from faking attendance by having a friend bring the student's mobile device into a class that the student is not actually attending that day. The authentication can require fingerprint or retina recognition in one example. In another example, a non-authenticated student device 122 can be displayed in a different color on the teacher device 112, which can prompt the teacher to visually inspect whether that particular student is present.

In another example, student devices 122 and 126 can begin broadcasting automatically, similarly to as described with regard to a teacher device 112 initiating class. For example, the student device 122 can detect that it is within the predefined time window of the class (e.g., a range with a start date and time and an end date and time associated with the class), and/or that the student device 122 is located within a geographic boundary of the classroom. The geo-fencing boundary and pre-determined time frame can be downloaded from the management server 138 and stored locally on the student device 122 in one example. In another example, the student device 122 can receive a communication from a beacon device that locally broadcasts a signal within the confines of a classroom, and this can trigger the student device 122 to begin broadcasting the session associated with the class.

Although this example involves the teacher device 112 listening for a broadcast by each student device 122 and 126, the teacher device 112 can, in one example, initiate class by broadcasting the session containing the identifier associated with the class, while the student devices 122 and 126 detect that initial broadcast. Upon detecting the initial broadcast, the student devices 122 and 126 can each then broadcast a reply to the teacher device to indicate that they are present, which the teacher device 112 can receive.

In still another example, a first student device 122 can listen for broadcasts of the session from a plurality of other student devices, including second student device 126. Upon detecting the broadcast from the second student device 126, the first student device 122 can rebroadcast the session on behalf of the second student device 126. This can include broadcasting a session having a class identifier and an array of student device identifiers that the first student device 122 has recognized are present. In this way, short-range communication technologies such as Bluetooth can still be adequate for covering a larger classroom area, such as an auditorium.

At stage 230, the teacher device 112 can visually indicate which student devices 122 and 126 are present. As will be described with regard to FIGS. 7-10, the teacher device can display a graphical user interface that includes icons representative of students and/or student devices 122 and 126. A non-present student or student device can be indicated by a grayed-out representation or other visual representation. Student devices 122 and 126 that are present can display in color or be otherwise visually identified. Student devices 122 and 126 with locks can display in other colors or include a new icon indicating a particular lock profile. Additionally, student devices 122 and 126 that were present but then stop broadcasting can be displayed with a different icon and/or shading. Student devices 122 and 126 that have communicated as present but have not authenticated the presence of a student can display differently. Visual representations such as these can help a teacher 110 quickly determine who is present and/or the state of one or more student devices 122 and 126.

At stage 240, the teacher device 112 can initiate a lock to be applied to the student device 122. In one example, the teacher 110 selects one or more students 121 and/or student devices 122 and selects a lock profile to apply. The teacher device 112 then can send a first message to the management server 138, indicating the student devices 122 and 126 to lock and the lock profile to use. In one example, the first message includes a series of messages from the teacher device 112 to management server 138.

Based on the first message, the management server 138 can then communicate with each indicated student device 122 or 126 by causing one or more applications executing on the student device 122 or 126 to apply aspects of the lock profile. This can include relaying messages to the student device 122 or 126 through one or more messaging servers 148, as will be more fully discussed.

The management server 138 can also facilitate communication between the teacher device 112 and the student devices 122 and 126 in the locked environment. For example, the management server 138 can generate an encryption key set for use between the first student device 122 and the teacher device 112. The encryption key set can be based on the class identifier, student device identifier, teacher device identifier, and the date. This can allow the student to transfer particular files (e.g., homework assignments) or test answers directly to the teacher device in a locked peer-to-peer environment for the duration of the class. In another example, documents can be communicated from students to the teacher through the management server 138, which can build into the document a watermark based on the class identifier, student device identifier, and/or submission date. In this way, the management server 138 can ensure that the submissions are timely submitted and generated from registered and locked student devices 122.

At stage 250, the teacher device 112 can dismiss class. This can be done manually in one example, or can occur automatically when the class is scheduled to end in another example. In one example, dismissing class can cause the attendance data to be uploaded from the teacher device 112 to a server, such as management server 138.

In response to the class being dismissed, at stage 260 locks can be removed from the student devices 122 and 126. In one example, the management server 138 tracks all of the locks applied to student devices 122 and 126 during the course of the class. When the teacher device 112 notifies the management server 138 that the class is dismissed (or when the management server 138 otherwise determines class is dismissed), the management server 138 can loop through the tracked locks, determining which locks to remove, and communicating with the relevant messaging server 138 and student devices 122 to remove the locks.

In one example, the management server 138 can determine which of the locks to remove between classes. For example, the management server 138 can determine that a first student device 122 is going from a first class to a second class and that shared locks between the classes should be maintained. In addition, certain locks on texting and web browsing at school can be maintained by the management server 138 unless the student 121 is leaving a class to go to a lunch period or school has ended for the day. In the event that the class dismissed is the student's 121 last class of the day, the management server 138 can unlock all of the locks on the student device 122. In this way, unlocking can operate differently for different class periods, for example, with the last class of the day or the class prior to lunch recess causing removal of all locks, while other classes can only remove some of the locks.

Figure 3:
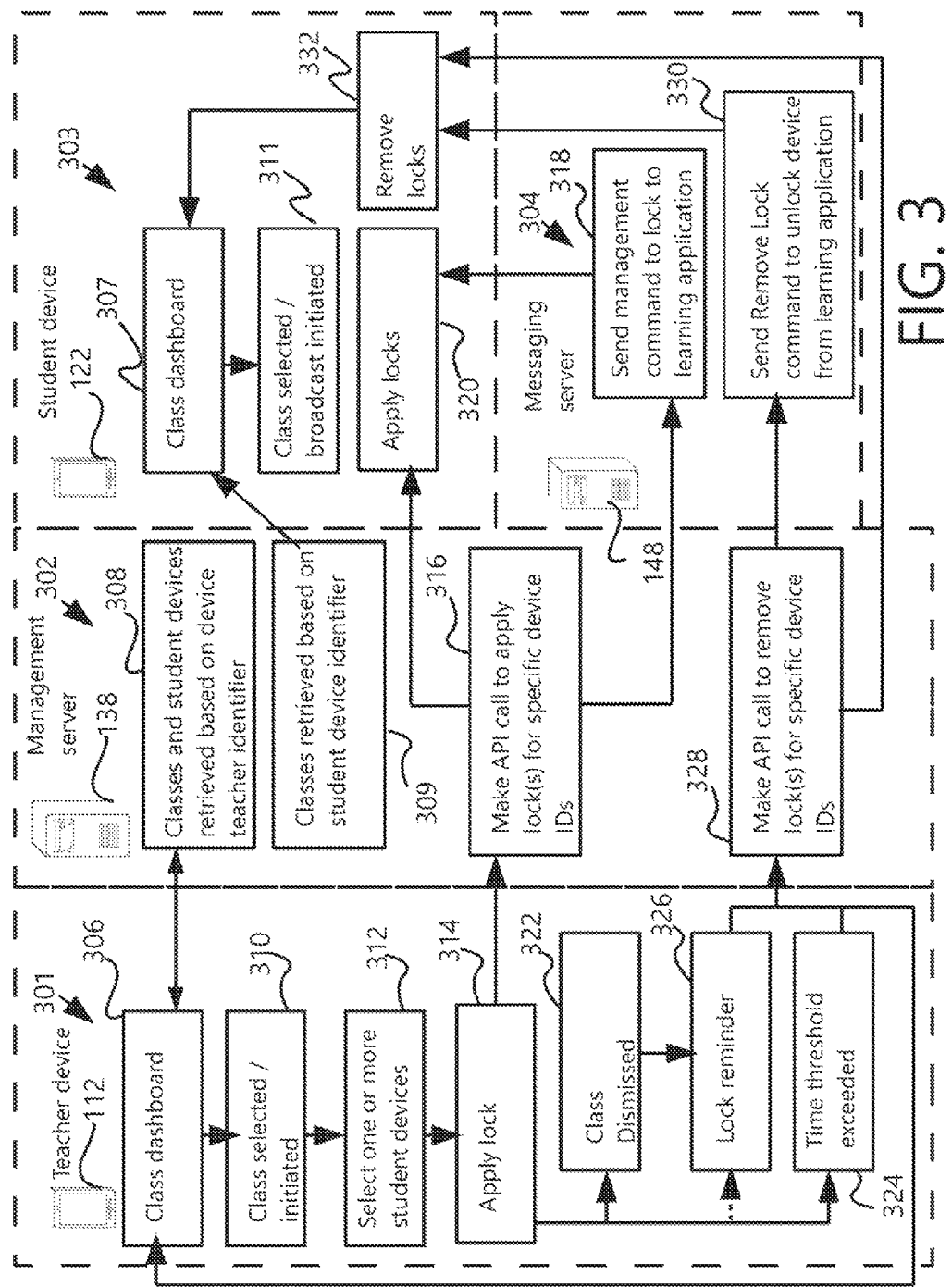
FIG. 3 is an exemplary flow chart with example stages for managing student devices in a classroom environment.

FIG. 3 shows an exemplary flowchart of steps performed by a teacher device 112, management server 138, messaging server 148, and a first student device 122. The steps performed in block 301 can be performed by a teacher device 112, steps in block 302 can be performed by a management server 138, steps in block 303 can be performed by a student device 122, and steps performed in block 304 can be performed by a messaging server 148.

Figure 7:
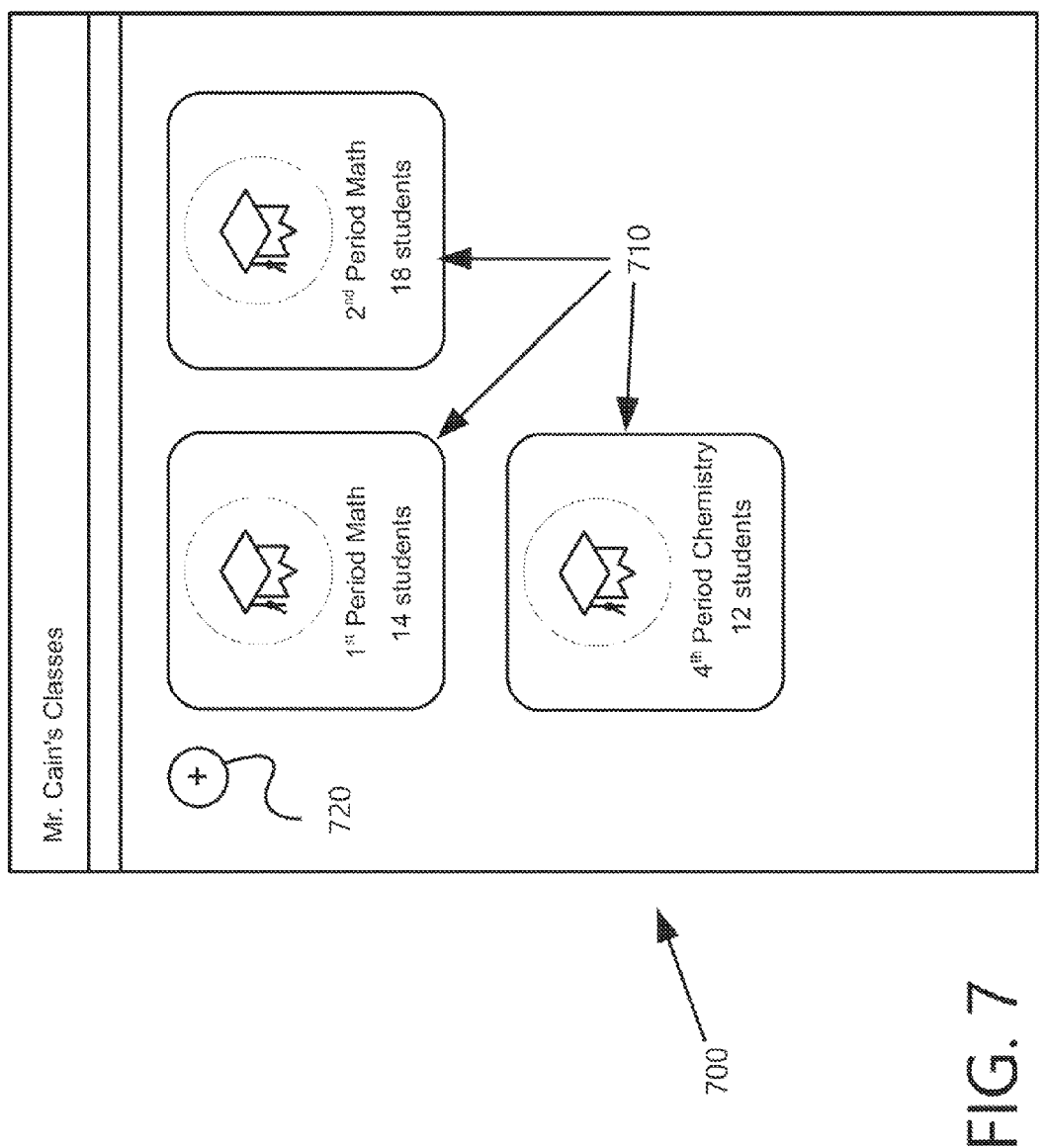
FIGS. 7-10 are exemplary illustrations of a graphical user interface.

At step 306, the teacher device 112 can display a class dashboard as part of a graphical user interface, which is further explained with respect to FIG. 7. The dashboard can allow the teacher to select between classes in an example.

The class dashboard can be populated based on data received from the management server 138 in an example. For example, at step 308, the management server 138 can send class and student device information to the teacher device 112 based on a teacher identifier that allows the management server 138 to identify the teacher. This information download can occur prior to the class beginning in an example, and can be performed as a periodic task (e.g., nightly or weekly) in one example. The information retrieved can populate the graphical user interface of the teacher device 112, ensuring that the teacher can select between appropriate classes and that the correct student devices 122 and 126 are associated with each class.

At step 310, the teacher can select a class using the class dashboard. Selecting the class can effectively initiate the class, causing the teacher device to broadcast and/or scan for broadcasts of sessions including the class identifier.

Before or afterwards, students entering the classroom can select the class from a class dashboard that is displayed on each respective student device 122 and 126 at step 307 in an example. The class dashboard can include class information that the student device has downloaded from the management server 138 at step 309. For example, the management server 138 can store a list of class identifiers associated with the student device 122 in a database, based on the classes that the student is registered to attend. At step 309, the management server can periodically send a list of class identifiers and other class information (e.g., description information) to the student device 122 in an example, based on the stored associations.

Based on the classes available, the student can select the present class at step 311. In another example, the class is automatically selected by the student device 122 based on factors previously discussed herein. This can initiate a peer-to-peer broadcast of a session including a class identifier and the device identifier.

As student devices are detected by the teacher device 112, the teacher device 112 can count them as present and highlight them accordingly in the graphical user interface.

At step 312, the teacher device 112 can select one or more student devices on the graphical user interface, and apply a lock at step 314. The lock selected by the teacher can be a lock profile that actually includes a plurality of different locks to apply in one example. In one example, the teacher can select the students and locks to apply before the student devices are detected as present, and then, on a rolling basis, as the student devices are detected and counted present, the teacher device 112 can contact the management server 138 to apply the selected locks on the present student devices. The teacher device 112 can supply at least one student device identifier and at least one lock profile identifier to the management server 138.

Upon receiving the message from the teacher device 112, at step 316 the management server 138 can interpret the lock request and determine which API calls to make to each student device to carry out the lock. Because different student devices 122 and 126 can operate on different operating systems, the API calls are selected for compatibility with the management API 535 and operating system 530 operating on the respective student device 122.

If the lock profile requires locking the student device 122 into an application, then the management server 138 can retrieve information regarding one or more messaging servers 148 correlating to the student device 122 from a database. The management server 138 can make API calls to the one or more message servers 148, which can relay the instructions at stage 318 to the student device 122. If the lock profile includes locking resources of the student device 122, such as white-listing files, websites, or other device functionality within the learning application, the management server can correspond directly with the student device 122 in an example, such as through an application-level API 545. Alternatively the management server 138 can contact the messaging server 148 to have the messaging server 148 notify the student device 122 that the management server 138 has a message waiting for the student device 122. The student device can then contact the management server 138 and receive the instruction regarding one or more locks within the selected application (e.g., the learning application).

Through this process, at stage 320 the locks can be applied to student device 122.

Afterwards, the teacher can dismiss class at stage 322. In one example, this includes manually dismissing class by pressing a button on the GUI of the teacher device 112. In another example, the class is dismissed when the teacher initiates another class. Dismissing the class can start the process for removing locks from the student devices.

At stage 326, in one example, the teacher device 112 presents a lock reminder to the teacher, reminding the teacher to deactivate the locks. In another example, the reminder merely warns the teacher that the student devices are about to unlock, in case the class is running long, in which case the teacher can still otherwise expect the student devices to remain locked. The reminder can display before a class dismisses in one example, such as with a couple minutes remaining. For example, a class can technically end while the students are finishing an exam. The reminder can allow the teacher to extend the locks in one example, by pressing a button that delays unlocking by a time period, such as five minutes.

In another example, at stage 324 the teacher device 112 automatically dismisses class by detecting that a time threshold has passed and the class should have concluded. Alternatively, the management server 138 can dismiss class by unlocking the relevant locks after the class time threshold has passed. This can prevent, for example, student devices from remaining locked if the teacher device loses power or is otherwise unable to initiate the unlock sequence.

In one example, the lock sent to the student device 122 includes a time limit, such that the student device 122 can unlock itself after the time threshold is exceeded at stage 324. In another example, the management server 138 determines whether the time threshold is exceeded and starts the unlocking process without further contact with and/or input from the teacher device 112.

In another example, at stage 328, the unlock process includes the management server 138 determining which locks to remove within the locked application and/or whether to unlock the student device from the locked application (e.g., the learning application). The management server 138 can make API calls to the relevant messaging server 148 at stage 328, which in turn can send a command to unlock the student device 122 from the learning application at step 330. The management server can additionally or alternatively adjust locks to resources within the learning application. This can involve the student device 122 contacting the management server 138 to adjust or remove the locks in one example and/or the management server 138 can directly unlock resources of the locked application, such as sub-applications, documents, or web resources available on the student device 122.

Figure 4:
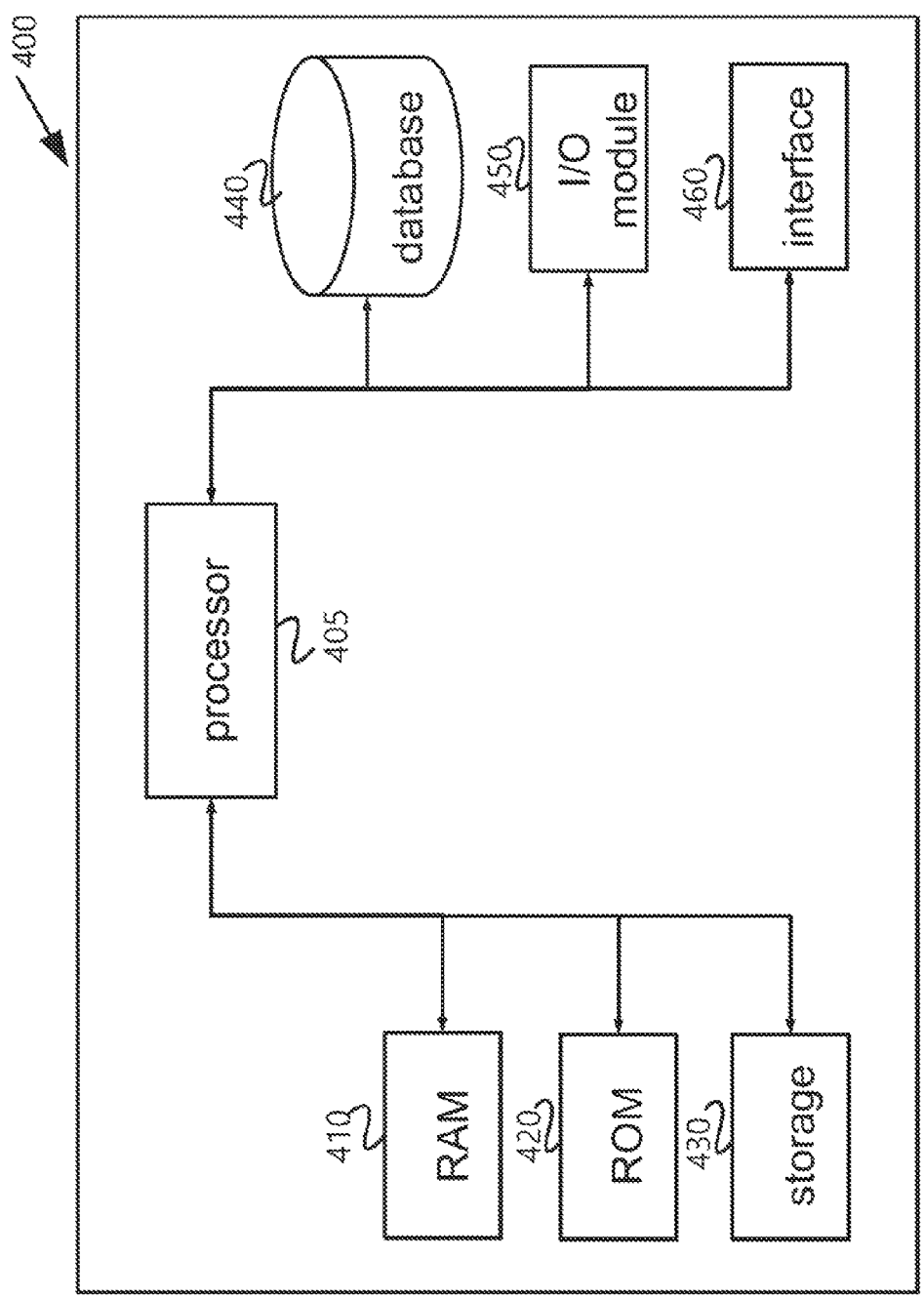
FIG. 4 is an exemplary illustration of system components.

FIG. 4 depicts an exemplary processor-based computing system 400 representative of the type of computing system that can be present in or used in conjunction with a management server 138, messaging server 148, or a computing device such as teacher device 112 or student device 122 or 126 of FIG. 1. The computing system 400 is exemplary only and does not exclude the possibility of another processor- or controller-based system being used in or with one of the aforementioned components. Additionally, a computing device or system need not include all the system hardware components in an example.

In one aspect, system 400 can include one or more hardware and/or software components configured to execute software programs, such as software for storing, processing, and analyzing data. For example, system 400 can include one or more hardware components such as, for example, processor 405, a random access memory (RAM) module 410, a read-only memory (ROM) module 420, a storage system 430, a database 440, one or more input/output (I/O) modules 450, and an interface module 460. Alternatively and/or additionally, system 400 can include one or more software components, such as a computer-readable medium including computer-executable instructions for performing methods consistent with certain disclosed examples. It is contemplated that one or more of the hardware components listed above can be implemented using software. For example, storage 430 can include a software partition associated with one or more other hardware components of system 400. System 400 can include additional, fewer, and/or different components than those listed above. It is understood that the components listed above are exemplary only and not intended to be limiting.

Processor 405 can include one or more processors, each configured to execute instructions and process data to perform one or more functions associated with system 400. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 4, processor 405 can be communicatively coupled to RAM 410, ROM 420, storage 430, database 440, I/O module 450, and interface module 460. Processor 405 can be configured to execute sequences of computer program instructions to perform various processes, which will be described in detail below. The computer program instructions can be loaded into RAM for execution by processor 405.

RAM 410 and ROM 420 can each include one or more devices for storing information associated with an operation of system 400 and/or processor 405. For example, ROM 420 can include a memory device configured to access and store information associated with system 400, including information for identifying, initializing, and monitoring the operation of one or more components and subsystems of system 400. RAM 410 can include a memory device for storing data associated with one or more operations of processor 405. For example, ROM 420 can load instructions into RAM 410 for execution by processor 405.

Storage 430 can include any type of storage device configured to store information that processor 405 can need to perform processes consistent with the disclosed examples.

Database 440 can include one or more software and/or hardware components that cooperate to store, organize, sort, filter, and/or arrange data used by system 400 and/or processor 405. For example, database 440 can include user account information, class information, device settings, and other user preferences or restrictions. Alternatively, database 440 can store additional and/or different information. Database 440 can also contain a plurality of databases that are communicatively coupled to one another and/or processor 405, which can be one of a plurality of processors utilized by a server or computing device.

In one example, the database 440 can include one more tables that store a class identifier, a class description, at least one class start time and end time pair (e.g., datetime data type that includes both a date and a time). In one example, a separate table links a class identifier to start and end dates and times. A table can also link a teacher identifier to one or more class identifiers. A further table can link one or more student device identifiers to a class identifier. A table for mobile device information can include columns for a device identifier, operating system type, a corresponding messaging server type, message server electronic contact information, student information, and/or other information.

I/O module 450 can include one or more components configured to communicate information with a user associated with system 400. For example, I/O module 450 can include a console with an integrated keyboard and mouse to allow a user to input parameters associated with system 400. I/O module 450 can also include a display including a graphical user interface (GUI) for outputting information on a monitor. I/O module 450 can also include peripheral devices such as, for example, a printer for printing information associated with system 400, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 460 can include one or more components configured to transmit and receive data via a communication network, such as the Internet, a local area network, a workstation peer-to-peer network, a direct link network, a wireless network, or any other suitable communication platform. For example, interface 460 can include one or more modulators, demodulators, multiplexers, demultiplexers, network communication devices, wireless devices, antennas, modems, and any other type of device configured to enable data communication via a communication network.

Figure 5:
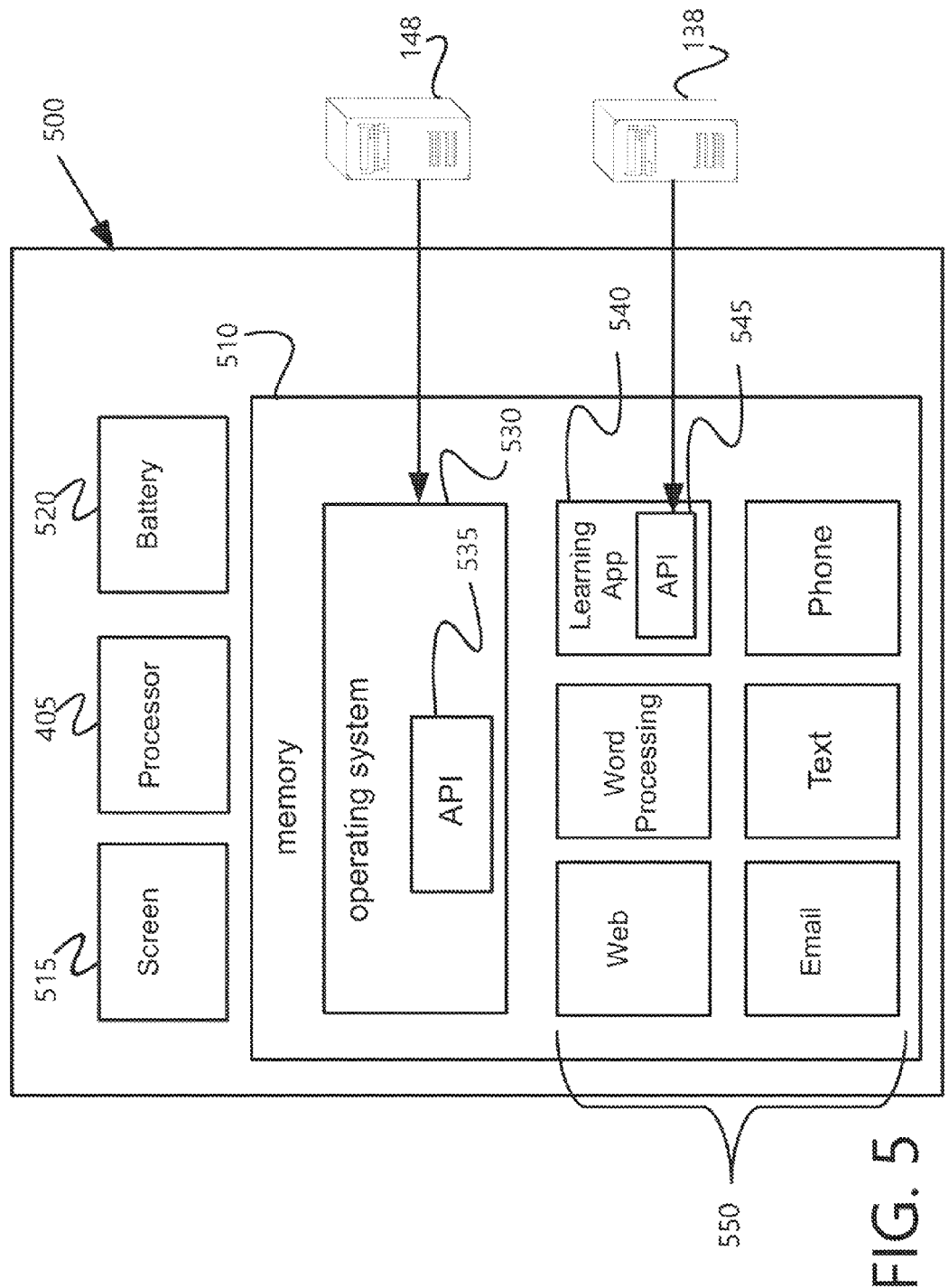
FIG. 5 is an exemplary illustration of components of a mobile device.

FIG. 5 is an exemplary illustration of hardware and software running on a student device 500, which can allow the system to apply locks to particular functionality of the student device 500. The processor 405 can be powered by a battery 520 and execute instructions stored on a non-transitory computer-readable medium 510. These instructions can cause the student device 500 to run software for use in a classroom environment, including a container that helps carry out the functions described herein. The student device 500 can also include a screen 515 for displaying the graphical user interface.

The processor 405 can execute the instructions to run an operating system 530, in one example. The operating system 530 can execute a management services API 535 that includes procedure calls for managing applications and other device functionality. For example, the management services API 535 can include a procedure call for locking the student device 500 into a single application. This can allow administrators and teachers to lock the student device 500 into learning application 540 or otherwise restrict the student device 500 functionality in a learning environment.

This can be done in one example by calling API 535 procedures in the operating system 530 to invoke a single application mode. Single application mode can restrict the student device 500 to only running the learning application 540 and other essential processes maintained by the operating system 530. In this way, the student's personal data can be isolated and locked from use while at class, and usage of the student device can be limited to applications that can be controlled through the management services API 535.

In another example, the management server 138 can lock the student device into some or all "managed" applications 550 using procedure calls at the management services API 535. In this example, the student can toggle between the managed applications. The teacher can also whitelist or blacklist some of the managed applications so that the student can only access a subset of the managed applications 550.

In the illustrated example, the managed applications 550 that a user can be locked into via the management services API 535 include a web browser, word processor, email, texting application, phone application, and a learning application. These managed applications are exemplary only, and other applications can be updated or sent to the student devices 500 in one example by the management server 138. In this way, applications of specific relevance to a class can be loaded onto the student device 500 and locked or unlocked for use by the teacher device 112 in conjunction with the management server 138.

One potential benefit of the management services API 535, the managed applications 550, and application-level API 545, is that a student can still maintain all of their personal information and applications on their student device 500 (e.g., in unmanaged applications). But during class time, the management server 138 can configure (e.g., lock) the student device 500 to disallow access to apps and other resources that are unmanaged and can serve as distractions. In addition, the class-specific apps can be easily uploaded, updated, or even deleted from student device 500 by an administrator of the management server, for example, when the school year ends.

In one example, the management server 138 can also control functionality of the learning application 540 through procedure calls available at an application level API 545. The learning application 540 can have access to various resources. These resources can include files and sub-applications, such as email or web browsing. The application-level API 545 can allow the management server 138 to restrict which of the files a student can access from within the learning application 540. The application-level API 545 can also include procedures for enabling or disabling sub-applications. Thus, the management server 138 can make procedure calls at the application-level API 545 to implement file locks and web locks.

Thus, a teacher can restrict resource (e.g., asset) access by locking the student device 500 into the learning application 540, and restricting which resources are available from within that application 540. In one example, the other managed applications 550 can act as sub-applications that are lockable resources (e.g., assets) within the learning application 540.

Whereas a messaging server 138 can be utilized for locking and unlocking the student device 500 into managed applications 550 via the operating system 530 management services API 535, the management server 138 can be responsible for setting resource-specific locks (e.g., which sub-applications to lock, which files to lock, and which websites to lock) via the application-level API 545. This can give teachers the ability to tailor student device 500 functionality from class to class.

In another example, the management server 138 can utilize API 545 to send files to the student device 500. The student can then modify and upload the files back to the management server 138. From there, a teacher device can download the modified files.

In one example, if the student device 500 is not locked exclusively into the learning application 540 during a class period, the learning application 540 can cause the student device to broadcast a session with the class identifier and a code that notifies the teacher device that the learning environment is not secure for that student. In another example, the learning application 440 can cause the student device 500 to notify the management server 138 regarding learning environment insecurity. The management server 138 can then attempt to reapply one or more locks. The learning application 440 can detect that the student device 500 is not in single application mode by checking a flag in the operating system 530, in an example.

Figure 6:
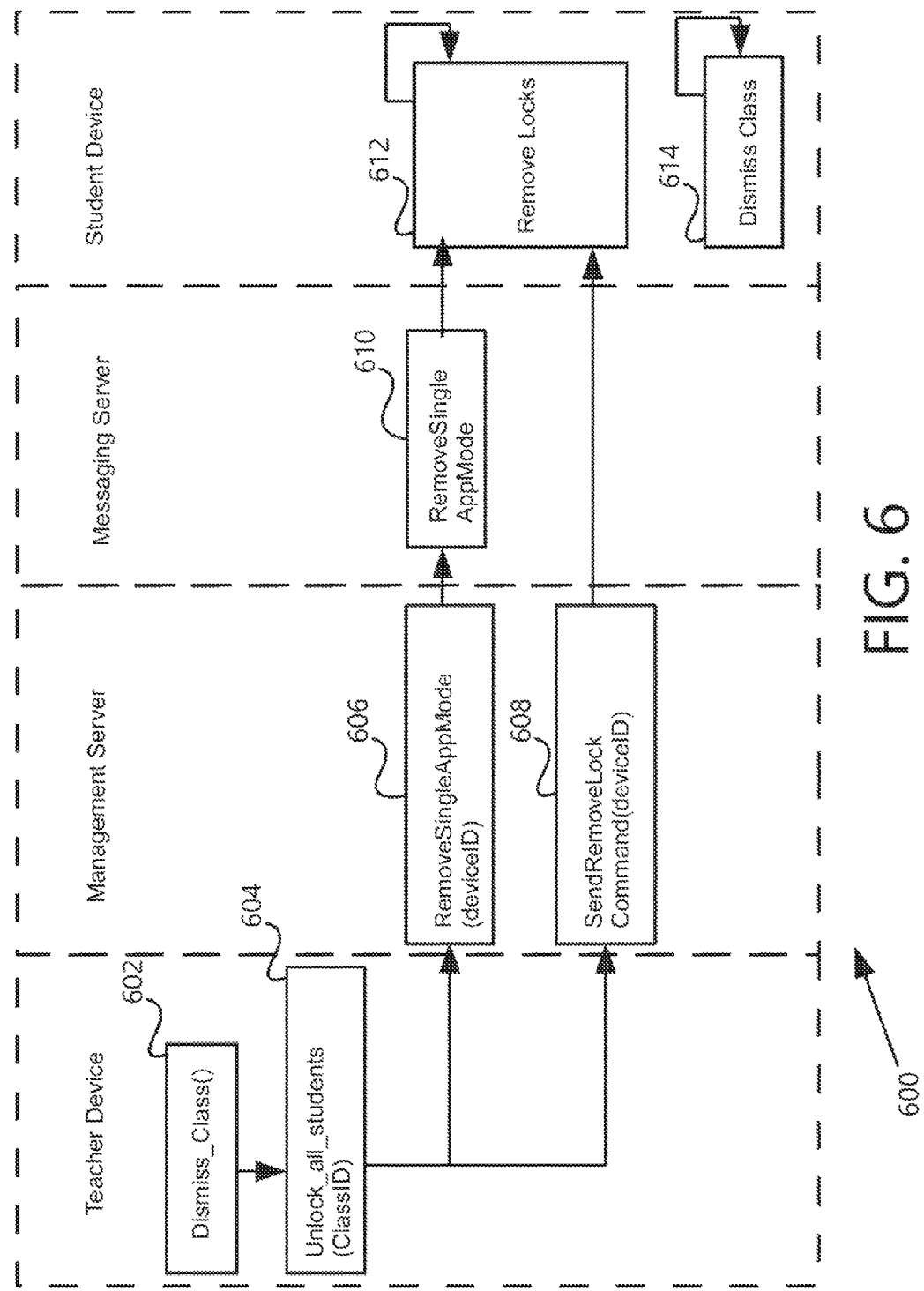
FIG. 6 is an exemplary flow chart with exemplary procedure calls.

Turning now to FIG. 6, an exemplary illustration of procedure calls involved in unlocking the student devices when a class is dismissed is illustrated. At stage 602, the teacher device executes a Dismiss_Class procedure. This can be triggered manually or automatically when a time period associated with the class expires.

At stage 604, the Dismiss_Class procedure can retrieve the class identifier and then call the Unlock_All_Students procedure, supplying the class identifier as an input variable to the procedure. The Unlock_All_Students procedure can then contact the management server and supply the class identifier, causing the management server to retrieve from a database all of the student device identifiers associated with the class identifier. Then, the management server can loop through the retrieved student device identifiers, executing stages 606 and 608 for each student identifier. In an alternate example, the teacher device can retrieve locally-stored student device identifiers associated with the class identifier, and execute separate calls to the management server for each retrieved student identifier.

At stage 606, the management server can execute a procedure to remove single application mode, supplying a device identifier as an input to the procedure. This can cause the management server to determine from database records which messaging server is associated with the student device. Based on that determination, a message can be sent to the messaging server to cause it to contact the student device at stage 610 to remove single application mode. The messaging server can utilize the operating system API to do so. This can allow the student device to access applications other than the learning application in one example, when the lock into the single application is removed at stage 612. In one example, removing single application mode can include causing the student device to contact the management server.

At stage 608, the management server can execute a procedure that sends a lock removal command directly to the student device based on the device identifier. For example, this can include making procedure calls through an application-level API. This removal command can cause the student device to remove locks and restrictions within the learning application at stage 612. For example, sub-applications can be disabled, or access to files or websites can be restricted based on a white list or black list. This can be accomplished by calling procedures and routines within the learning application from the management server 138 in one example.

The remove lock command can also cause the student device to execute a class dismissal process at stage 614. This can cause the graphical user interface on the student device (within the learning application) to return to a home screen where a different class can be selected by the student.

Turning now to FIG. 7, an exemplary illustration of a graphical user interface (GUI) 700 that can be displayed on the teacher computing device as part of the learning environment is shown. Although this example utilizes a localized application GUI running as part of the client software for illustration purposes, similar functionality and presentation can be accomplished with a webpage in an example, as is the case in FIG. 10.

Continuing with FIG. 7, a plurality of classes 710 are displayed for selection by the teacher. The information relating to each class can be downloaded by the teacher device from the management server 138, such as by accessing relationships between the teacher and/or teacher device and classes in a database.

The teacher can be able to manually add a class in one example, through selecting an option or hitting a button 720. In one example, the teacher can be a substitute teacher, and the class can be added temporarily to the GUI. For example, an administrator can associate the teacher device identifier with a class identifier for a period of time, such that the teacher device only is granted access to the class for that time period.

Figure 8:
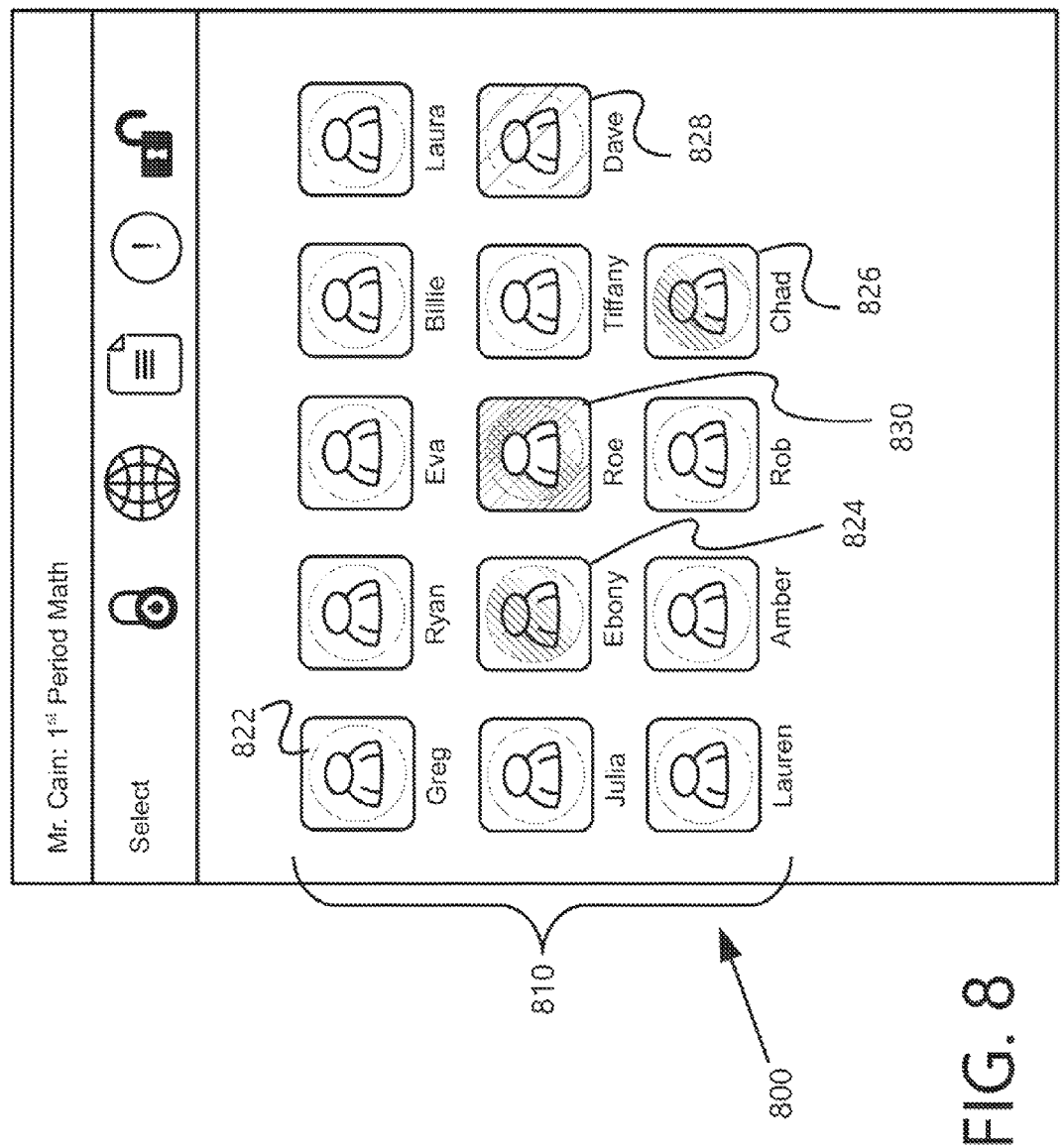

In this example, the teacher "Mr. Cain" can select "1st Period Math." Doing so can cause the GUI to display students associated with the class, for example, as shown in FIG. 8. Selecting the 1st Period Math class can cause Mr. Cain's teacher device to begin listening for student device broadcasts that include the class identifier associated with 1st Period Math.

As shown in FIG. 8, icons 810 representing the students associated with Mr. Cain's 1st Period Math class are displayed on the screen 800 of Mr. Cain's teacher device. The icons can highlight differently based on whether an associated student device has been detected as present over a peer-to-peer connection in an example. For the purposes of this disclosure, this highlighting can visually indicate that a first student device is present in the class. For example, whereas Greg 822 can highlight as present, Ebony 824 and Chad 826 can be greyed-out, indicating that the teacher device has not yet detected a student device as being present for those students.

In one example, an additional distinguishing color or shading can be applied for student devices that the teacher device no longer detects as present even though an initial detection was made. For example, if Dave leaves the classroom while the class is in session, after a threshold period of time of not detecting Dave's student device, the teacher device can highlight Dave 828 differently to indicate he is no longer in class.

Still further visual indicators can draw the teacher's attention to any student that is present but was tardy. In this example, a student device belonging to Roe 830 can have communicated with the teacher device more than a threshold time period after the start time of the class.

The teacher device can track attendance and attendance events, such as a device no longer being present during the class, and report the attendance and attendance event data to the management server for storage and further use.

Figure 9:
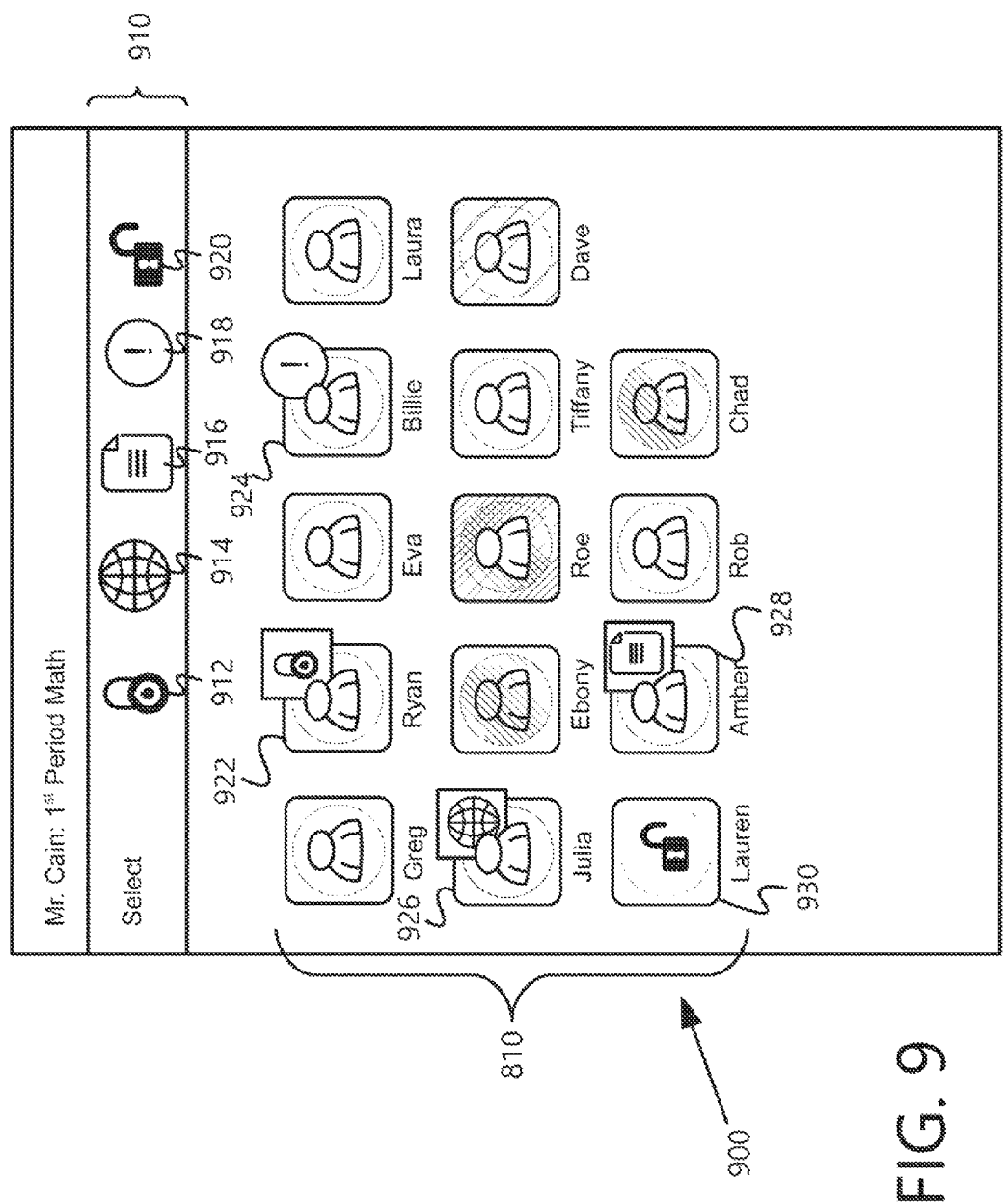

Turning to FIG. 9, the GUI 900 can also present visual indicators of locks that are applied to student devices in an example. In one example the teacher can select one or more of the students 810, and select one or more locks or lock profiles 910 to apply to the devices associated with the selected students. An icon can also be provided for selecting groups of users, such as all students that are enrolled in the class or all students that are currently present in the class.

A first lock type can be an application lock 912. In one example the application lock 912 can lock the student into one or more selected applications for the duration of class. This can keep the student from using other distracting applications, such as the phone application, during class. The application lock 912 can lock the associated student device into the selected managed applications via the management API 535 on the student device.

A second lock type can be a web lock 914. The web lock 914 can restrict web browsing from within the managed applications to specified websites (e.g., a white list) that are controlled by the management server 138. The student device can download the white list or a black list from the management server 138 in one example. In another example, the learning application causes the student device to contact the management server 138 prior to navigating to a website, so that the management server 138 can compare the request against a white or black list.

A third lock type can be a document lock 916. The document lock 916 can restrict the student device to opening documents from within the learning application that are on a white list, or prevent opening of documents that can be on a black list. The respective lists can be downloaded or implemented as described with regard to the lists for a web lock 916. In one example, the document or file lock can be controlled by first locking the student device into a managed application. The managed application can include sub-applications, such as a word processing application or a video player. The managed sub-applications can check a whitelist or blacklist, as appropriate, before opening a file. Once opened, the device can restrict a user from opening other files or applications.

As an example, the document lock 916 can allow a teacher to lock answers to a class exercise until after the exercise is complete, ensuring that the student will not have access to answers prematurely. Additionally, class lesson plans can include documents or media clips that only become relevant later in the lesson, and the document lock 916 can prevent the student from becoming distracted by prematurely exploring those materials.

A fourth lock type can be a custom lock profile 918. A plurality of lock profiles can be available for selection in an example. The lock profile 912 can apply a combination of application locks, web locks, and document locks in one example. This can allow a teacher to quickly apply all the relevant locks for that class. The teacher device or administrative console can be used to customize the lock profile and store it on the management server in one example. Executing the lock profile can involve sending a lock profile identifier to the management server so that it can coordinate all the applicable locks in one example. In another example, the teacher device itself can loop through the applicable locks, sending multiple locking messages to the management server.

In still a further example, the locks can include timing information for applying and removing the locks. For example, the student device can receive a lock instruction with a time limit. In this way, a lock profile 912 can allow for a series of locks to be applied and unlocked during the course of the class. For example, a student can receive staggered access to materials and media during a lesson plan, then locks can be applied during a quiz towards the end, with answers unlocking after the quiz is scheduled to end.

Another lock profile can allow for the teacher to lock additional or all student device functionality within the learning application as a punishment. For example, a teacher can apply a lock to texting functionality that remains in place even during lunch period if the management server recognizes the lock profile as a punishment lock profile.

Additionally, the teacher device can be able to select an option 920 to remove the locks. In one example, this occurs as part of dismissing class, which can include detecting that a time threshold has been exceeded. In another example, the teacher can prematurely remove the locks, such as if class is over early or if the locks are no longer needed in the class.

Visual indicators can show which locks are applied to which students. For example, Ryan 922 can have an application lock applied. Billie 924 can have a lock profile applied. Julia 926 can have a web lock applied, and Amber 928 can have a document lock applied.

Still further visual indicators can draw the teacher's attention to any students that appear to have a reporting student device that is not yet locked into single application mode. In this example, Lauren 930 has a student device that has communicated with the teacher device. However, the teacher device can not yet have received confirmation from the management server that Lauren's student device is locked into the learning application. This means that Lauren 930 could potentially access other applications that are restricted during the class.

The GUI 900 can present additional indicators not illustrated here. For example, the GUI can indicate battery levels of the student devices in one example. This can allow the teacher to better assess whether to utilize student devices for an upcoming portion of the class, or, if multiple battery levels appear to be low, to instead perform class functions under more traditional means.

Figure 10:
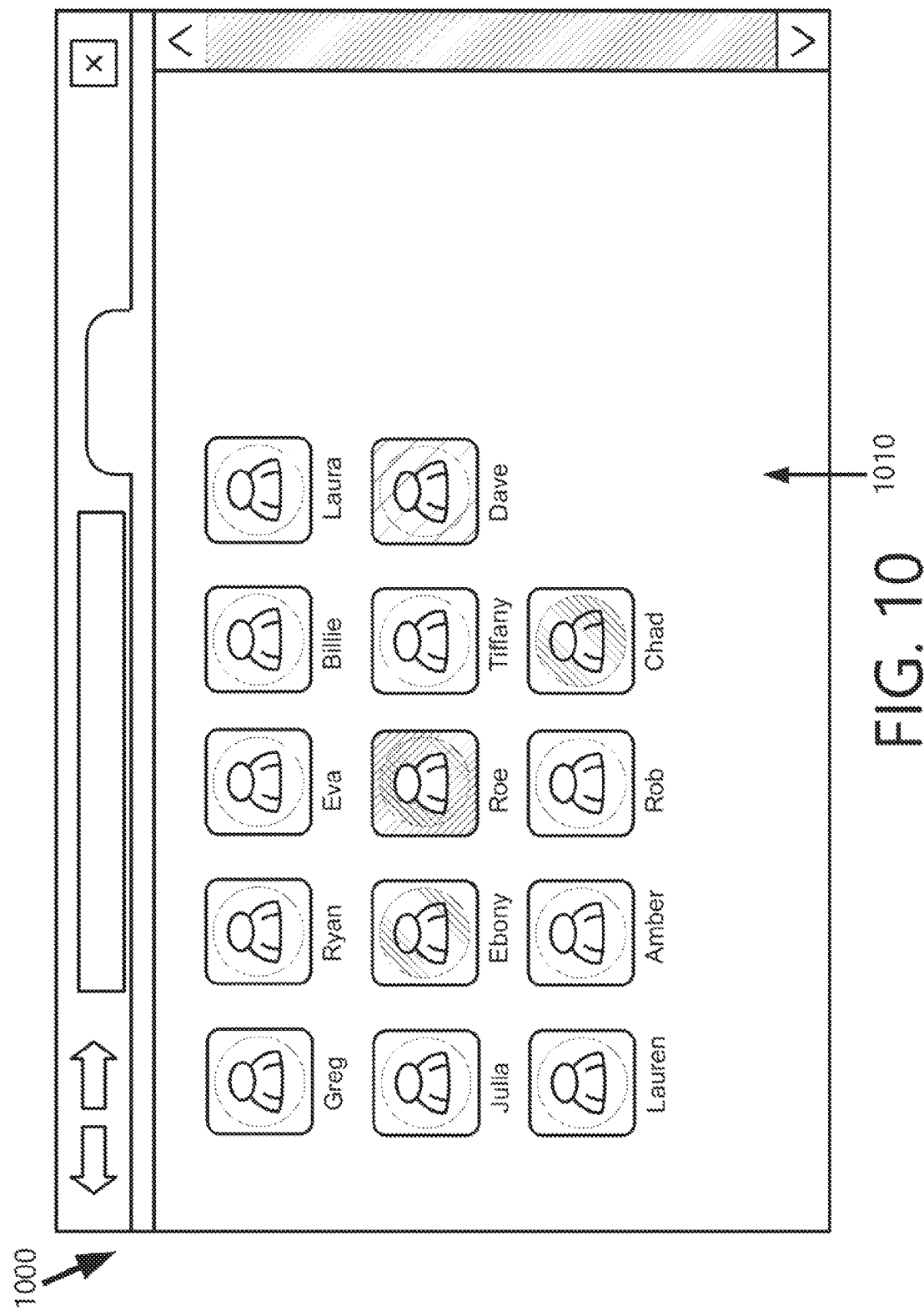

FIG. 10 includes an example illustration of a graphical user interface (GUI) 1000 that the teacher can access on a web browser 1010 on the teacher device in one example. The web browser GUI 1010 can allow the teacher to view attendance and set locks similar to the application GUI discussed above.

Figure 11:
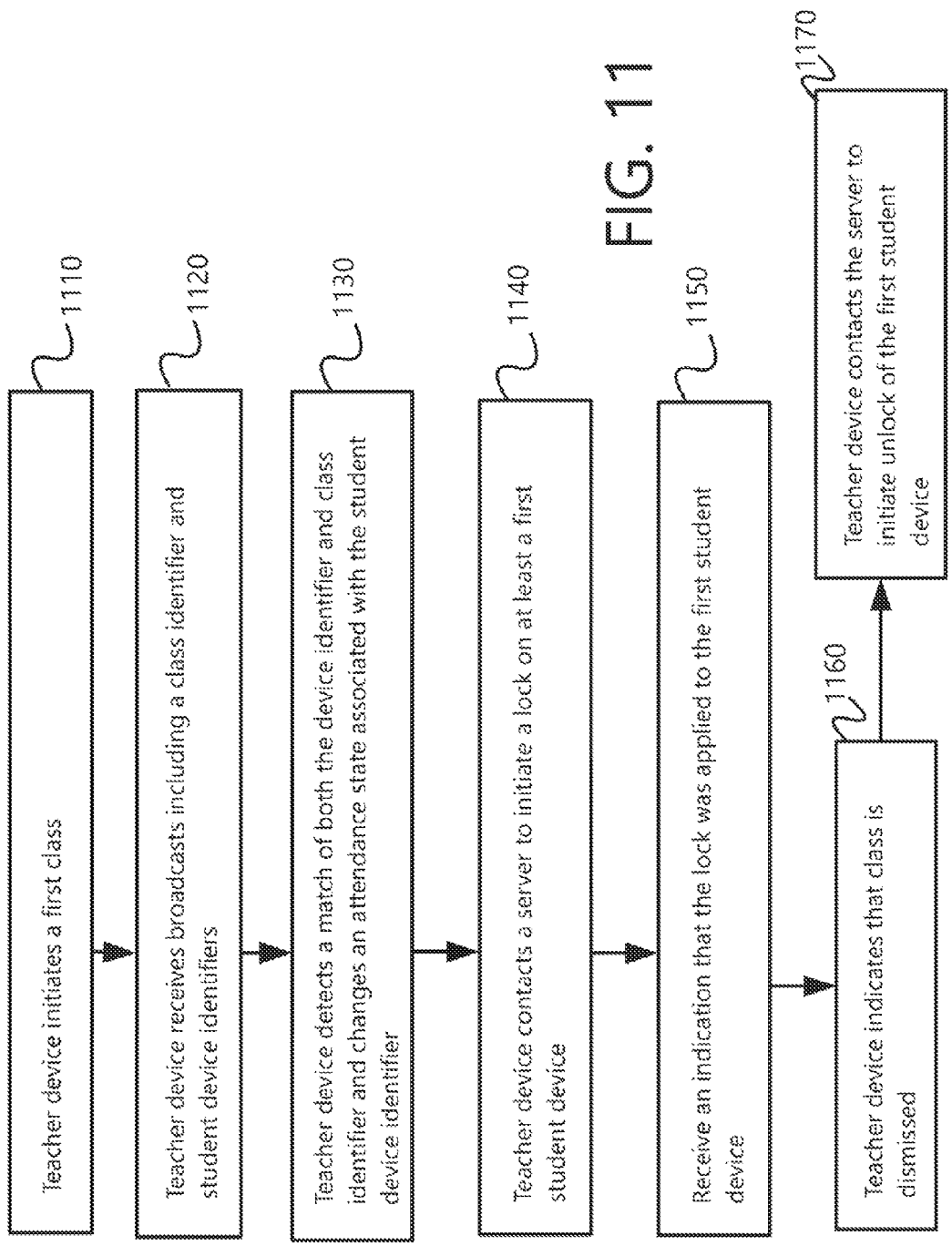
FIG. 11 is an exemplary flow chart of stages performed by a teacher device.
Figure 12:
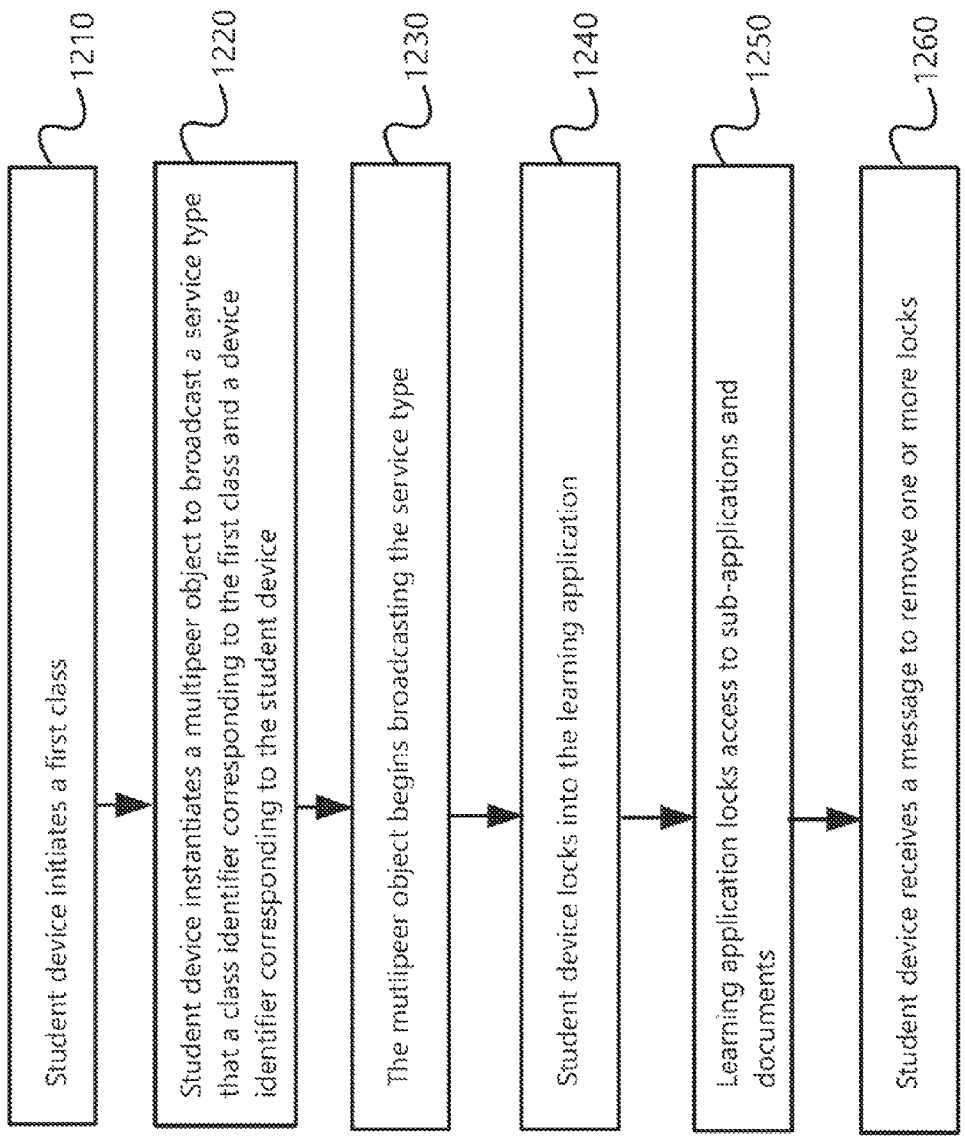
FIG. 12 is an exemplary flow chart of stages performed by a student device.
Figure 13:
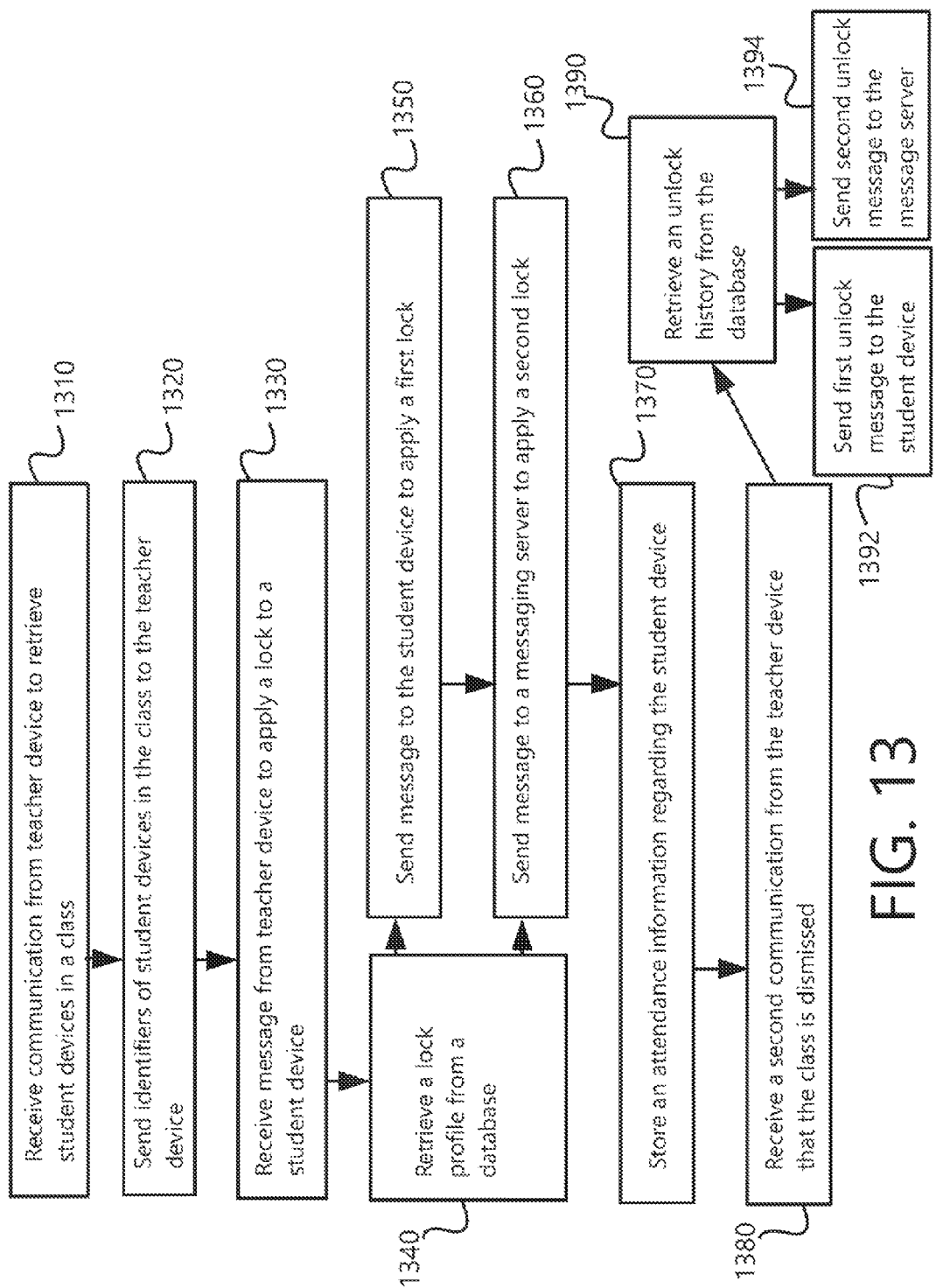
FIG. 13 is an exemplary flow chart of stages performed by a management server.

FIGS. 11-13 are additional exemplary flow charts, from the perspectives of the teacher device, the student device, and the management server, respectively.

Turning to FIG. 11, further exemplary stages that can be performed by a teacher device are illustrated. At step 1110, the learning application running on the teacher device can initiate the first class having a class identifier.

At stage 1120, the teacher device receives broadcasts including the class identifier and a device identifier. The broadcasts can occur peer-to-peer, such as using Bluetooth, WIFI, or another non-server-based communication mode.

To receive these broadcasts, the teacher device can instantiate a multipeer manager object at the initiation of a class. The multipeer manager object can fetch class metadata, such as a class identifier, class name, and class teacher information from core data, and be responsible for browsing a service type transmitted from student devices through a peer-to-peer communication protocol. The service type can include a class identifier associated with the selected class, and a device identifier corresponding to the student device. The class identifier can be set by an administrator or administrative process in one example.

The multipeer manager object can scan for a service type including the class identifier. For example, a service type can comprise a string format in an example that includes "cl-[class identifier]".

The multipeer manager object can also hold a reference to the device identifier (unique to the teacher device) and a session identifier. The session identifier can become active once the student device and teacher device connect with one another, and can void when the connection is inactive or suspended.

Upon recognizing a service type broadcast, at stage 1130, the teacher device can compare received class identifiers to the class identifier. Where a match exists, the teacher device can use the multipeer framework to receive a device identifier from the connected student device. The teacher device can then compare the received device identifier to stored device identifiers that are registered for that class. If the received device identifier is a match, the teacher device can indicate the student device is present. The indication can include visually differentiating within the GUI the detected student from those who have not yet been detected by the teacher device.

If the class identifier is a match but the device identifier is not a match, the teacher device can be prompted on the graphical user interface to assign the student device to a student. In one example, the unidentified student device can supply additional information over the multipeer framework to assist the teacher in identifying the student device. For example, the name of the device, name of the device owner, device phone number, or other available device information can be transmitted over the multipeer framework and presented on the screen of the teacher device.

At stage 1140, the teacher device can contact a management server to initiate a lock on a first student device that was detected as present. This can be to lock the first student device into using only the learning application and the sub-applications within it, in one example. In another example, the lock can include adding restrictions to sub-applications or file access within the learning application.

At stage 1150, the teacher device can receive an indication that the lock was applied to the first student device. This can be received from the management server in one example, or broadcast by the student device in another example.

At stage 1160, the teacher device can dismiss class. This can be done manually, or can occur automatically when the teacher device or management server detects that a time threshold has been exceeded. The teacher device 1160 can contact a management server at stage 1170 to initiate the unlock sequence, and the GUI can return to a home screen where the teacher can select another class.

FIG. 12 includes exemplary stages performed by a student device. At stage 1210, the student device can initiate a first class, such as by the student selecting the first class from within the learning application.

At stage 1220, the student device can instantiate a multipeer object. The multipeer object can fetch class metadata, such as a class identifier, class name, and class teacher information from core data, and be responsible for broadcasting a service type that the teacher device will recognize through a peer-to-peer communication protocol. The service type can include a class identifier associated with the selected class, and a device identifier corresponding to the student device. The class identifier can be set by an administrator or administrative process in one example.

At stage 1230, the multipeer object can broadcast the service type including the class identifier. For example, a service type can be created with a string format in an example that includes "cl-[class identifier]". The broadcast can transmit the service type.

The multipeer object can also hold a reference to the device identifier (unique to the student device) and a session identifier. The session identifier can become active once the student device and teacher device connect with one another, and can void when the connection is inactive or suspended.

After the teacher device has recognized the broadcast, at stage 1240 the student device can be locked into an learning application. This can include receiving a message from a message server that has authority to set the student device to single application mode. The message can set the learning application 540 to be the single application that executes.

At stage 1250, the student device can receive a lock from a management server that causes the student device to lock (e.g., restrict) access to sub-applications and/or documents otherwise accessible from within the learning application.

At stage 1260, the student device can receive a message to remove one or more locks. This can be in response to the class being dismissed, and can include disengaging from single application mode in one example.

FIG. 13 includes exemplary stages that can be performed by a management server. At stage 1310, the management server can receive a request for student devices associated with a class identifier. At stage 1320, the management server can send the student device identifiers to the teacher device. The management server can similarly send class identifier information to both teacher devices and student devices that are associated with that class identifier.

At stage 1330, the management server can receive a message from a teacher device to apply a lock to a first student device.

At stage 1340, the management server can retrieve a lock profile from a database. The retrieval can be based on a lock identifier received in the message in stage 1330 in one example. In one example, the lock profile retrieved from the database can specify a plurality of locks to apply to the first student device.

At stage 1350, a first message can be sent to a messaging server, which can forward the message to the student device. For example, the messaging server can lock the student device into the learning application.

At stage 1360, a second message can be sent to the student device to lock functionality within the learning application. In one example, the management server can still utilize the messaging server at stage 1350 by sending a third message to the messaging server to instruct the student device to retrieve a lock from the management server. Upon the student device contacting the management server, the lock to the sub-applications or documents within the learning application can be sent to the first student device.

At stage 1370, the management server can receive attendance information from a teacher device regarding the first student device, and store the information in a database.

At stage 1380, the management server can receive a communication from the teacher device that the class is dismissed. In another example, the management server can automatically detect class dismissal by comparing the current time against an end time for the class.

At stage 1390, the management server can retrieve lock history for each student device in the dismissed class.

At stage 1392, the management server can send a first message to unlock a lock that had been set within the learning application (e.g., to a document or sub-application). The first message can be sent in response to the student device contacting the management server at the behest of the messaging server in one example.

At stage 1394, the management server can send a second unlock message to the messaging server. The second message can be utilized to cause the student device to retrieve an unlock command (or the first message of stage 1392) from the management server in one example. In another example, the second message can cause the messaging server to end single application mode on the first student device, effectively unlocking the first student device from exclusively using the learning application.

Additional functionality can also be included in the system. For example, the system can onload new student devices at an administrative console in one example. For example, a school administrator or automated administrative process can register student devices for particular students and assign students to particular classes. The days and times of each class and the teacher for each class can be stored in a database together with the student and student device information. Moreover, the various features of the examples described herein are not mutually exclusive. Rather, any feature of any example described herein can be incorporated into any other suitable example.

Other examples of the invention will be apparent to those skilled in the art from consideration of the specification and practice of the invention disclosed herein. The terms "teacher" and "student" are not meant to limit the examples and are exemplary only. As used herein, a "teacher" can include any educator or administrative or managing user, and a "student" can be any user with a computing device that can be managed according to the techniques disclosed herein. Thus, although examples related to teachers and students are discussed herein, an example can be applied to other environments as well, such as corporate environments where employee attendance is tracked and device functionality is managed. In that instance, an employee would be considered a user and a manager can be considered the master for the purposes of this disclosure. It is intended that the specification and examples be considered as exemplary only, with a true scope and spirit of the invention being indicated by the following claims.

What is claimed is:

1. A non-transitory computer-readable medium containing instructions for managing user mobile devices in an environment, the instructions causing a processor to perform stages including:

receiving, at a teacher device, a session identifier and an associated device identifier, wherein the session identifier specifies a first session from a plurality of classes assigned to the teacher and the device identifier corresponds to a first user device of a student enrolled in the first session, wherein a teacher device uses the session identifier and device identifier to determine which communications to respond to;

receiving, at the teacher device over a peer-to-peer network, a plurality of transmissions including a first transmission from the first user device, wherein the first transmission includes the session identifier and the device identifier;

determining that the session identifier and device identifier are associated with the first session;

causing a graphical user interface to visually indicate that a user associated with the first user device is present in the first session and that another user associated with a second user device is absent, wherein the graphical user interface highlights present and absent users differently;

sending, to a server, a first message to apply a first lock to the first user device; and sending a second message to remove the first lock from the first user device upon detecting that the first session is dismissed.

2. The non-transitory computer-readable medium of claim 1, the stages further including receiving a plurality of device identifiers corresponding to user devices associated with the first session from the server, and wherein the determining stage includes comparing the device identifier in the first transmission against the plurality of device identifiers to determine the user is present.

3. The non-transitory computer-readable medium of claim 1, wherein the first lock is a web lock that includes a whitelist of accessible websites.

4. The non-transitory computer-readable medium of claim 1, wherein the first lock is a file lock that restricts access to a plurality of files.

5. The non-transitory computer-readable medium of claim 1, wherein the first message to apply the first lock causes the server to contact a messaging server to lock the first user device into using a single application for use in the first session.

6. The non-transitory computer-readable medium of claim 1, wherein the second message is sent in response to the processor determining that the first session has been dismissed based on the processor being outside a geographic boundary of the environment.

7. The non-transitory computer-readable medium of claim 1, wherein the second message causes the management server to remove locks based on a time threshold being exceeded.

8. The non-transitory computer-readable medium of claim 1, wherein the first message is automatically sent upon detecting that the first user device is present, wherein the first message initiates single application mode and at least one resource lock within an application that executes in the single application mode.

9. The non-transitory computer-readable medium of claim 1, wherein the user interface includes different visual representations of users that are present and absent based on the plurality of transmissions.

10. The non-transitory computer-readable medium of claim 1, wherein the user interface includes different visual indicators for at least two different types of locks applied to at least two user devices.

11. A system for managing user mobile devices in an environment, the system comprising:

a database that stores associations of user devices and master devices to sessions;

a communications interface for sending and receiving information over a network; and at least one processor that performs stages including:

sending to a master device a list of device identifiers associated with a first session identifier, wherein the device identifiers correlate to user devices associated with the first session identifier and the master device is associated with the first session identifier, wherein the first session identifier specifies a first class from a plurality of classes and is used with a device identifier by the master device to determine which communications to respond to, wherein the master device uses the communications to present a graphical user interface that highlights present and absent users differently;

receiving a lock request from the master device, the lock request pertaining to a first user device associated with the first session identifier;

causing a first resource to be locked from access on the first user device;

receiving an unlock request from the first master device as part of a session being dismissed, the unlock request pertaining to at least the first user device; and in response to the unlock request, removing the lock on the first resource at the first user device.

12. The system of claim 11, wherein the processor performs further stages including locking the first user device into a learning application and controlling which resources are accessible from within the learning application.

13. The system of claim 11, wherein the lock request includes a device identifier unique to the first user device and also includes the session identifier, and in response to receiving the request the processor performs further stages including:

validating that the device identifier and the master device are both associated with the session identifier;

sending a first message to a messaging server to cause the first user device to contact the communications interface; and sending a second message to the first user device to lock the first resource.

14. The system of claim 11, wherein the unlock request is generated by the master device based on the master device dismissing the session.

15. The system of claim 14, wherein locking the first resource includes sending a white list of websites that can be reached from within the learning application.

16. The system of claim 14, wherein the lock request refers to a lock profile with multiple locks to apply to the first device.

17. The system of claim 11, wherein the unlock request includes the session identifier, and the processor sends unlock messages to each user device that was present at the session and associated with the first session identifier in the database.

18. A computer-implemented method, including:

executing, on a user device, a first application with an application program interface;

broadcasting a signal over a peer-to-peer network that indicates the user device is present, wherein the signal includes a session identifier associated with a session, wherein the session identifier is unique to a class and is used with a device identifier by a master device to determine whether to respond to the broadcasted signal, wherein the master device uses the broadcasted signal to present a graphical user interface that highlights present and absent users differently;

receiving, from a server, a first message to initiate a lock on the first application via the application program interface; and receiving, from a server, a second message to remove the lock from the first application.

19. The computer-implemented method of claim 18, further including receiving a third message from a messaging server with instructions to lock the user device into the first application, wherein the first message is received from a management server and locks at least one resource from being accessed from within the first application.

20. The computer-implemented method of claim 18, wherein the first application includes web browser and file access functionality, and wherein the first message is one of a plurality of messages that restrict which files are accessible within the first application.

* * * * *